(12) United States Patent
Bruemmer et al.

(10) Patent No.: US 10,220,510 B2
(45) Date of Patent: Mar. 5, 2019

(54) UNIFIED COLLABORATIVE ENVIRONMENTS

(71) Applicant: Humatics Corporation, Cambridge, MA (US)

(72) Inventors: David J. Bruemmer, Idaho Falls, ID (US); Akshay Kumar Jain, Carlsbad, CA (US); Josh Senna, Carlsbad, CA (US)

(73) Assignee: Humatics Corporation, Cambridge, MA (US)

( * ) Notice: Subject to any disclaimer, the term of this patent is extended or adjusted under 35 U.S.C. 154(b) by 289 days.

(21) Appl. No.: 15/170,685

(22) Filed: Jun. 1, 2016

(65) Prior Publication Data

US 2017/0136622 A1    May 18, 2017

Related U.S. Application Data

(60) Provisional application No. 62/169,689, filed on Jun. 2, 2015.

(51) Int. Cl.

| | |
|---|---|
| *G06F 15/16* | (2006.01) |
| *B25J 9/16* | (2006.01) |
| *H04L 7/00* | (2006.01) |
| *H04L 29/06* | (2006.01) |
| *H04L 29/08* | (2006.01) |

(52) U.S. Cl.
CPC ............... *B25J 9/163* (2013.01); *B25J 9/161* (2013.01); *H04L 7/0008* (2013.01); *H04L 65/403* (2013.01); *H04L 67/104* (2013.01); *H04L 67/141* (2013.01); *H04L 67/18* (2013.01); *G05B 2219/23258* (2013.01);
(Continued)

(58) Field of Classification Search
CPC combination set(s) only.
See application file for complete search history.

(56) References Cited

U.S. PATENT DOCUMENTS

| | | |
|---|---|---|
| 6,054,950 A | 4/2000 | Fontana |
| 7,403,853 B1 | 7/2008 | Janky et al. |

(Continued)

OTHER PUBLICATIONS

International Search Report and Written Opinion of the International Search Authority; dated Aug. 29, 2016; PCT/US2016/035405.

(Continued)

*Primary Examiner* — Jonathan A Bui
(74) *Attorney, Agent, or Firm* — Wolf, Greenfield & Sacks, P.C.

(57) ABSTRACT

A unified collaboration environment is formed by establishing a local workspace positional frame of reference using a plurality of UWB transceivers. With a frame of reference established a communication link is established between each of the workspaces, and a collaboration module to establish a peer-to-peer network. Data is received from each of the workspaces including the local workspace frame of reference, the set of available assets and workspace behavior (tasks). The collaboration module crafts a unified collaboration environment by transforming the local workspace into a collaborative positional frame of reference. A user, through a user interface, can offer real-time input to a virtualized version of the workspace to augment actions within the workspace environment.

10 Claims, 3 Drawing Sheets

(52) U.S. Cl.
CPC .............. *G05B 2219/25022* (2013.01); *G05B 2219/40391* (2013.01); *G05B 2219/40411* (2013.01)

(56) References Cited

U.S. PATENT DOCUMENTS

| | | | |
|---|---|---|---|
| 7,468,696 | B2 | 12/2008 | Bornholdt |
| 8,063,825 | B1 | 11/2011 | Yang |
| 8,199,047 | B2 | 6/2012 | Fretenburg et al. |
| 8,253,985 | B2 | 8/2012 | Fu et al. |
| 8,275,193 | B2 | 9/2012 | Lin |
| 8,314,731 | B2 | 11/2012 | Fretenburg et al. |
| 8,868,323 | B2 | 10/2014 | Lommel et al. |
| 9,612,325 | B2 | 4/2017 | Taylor, Jr. et al. |
| 2005/0134440 | A1 | 6/2005 | Breed |
| 2006/0277086 | A1 | 12/2006 | Hubbard et al. |
| 2006/0277089 | A1 | 12/2006 | Hubbard et al. |
| 2008/0088508 | A1 | 4/2008 | Smith |
| 2008/0303717 | A1 | 12/2008 | Durban et al. |
| 2010/0058201 | A1* | 3/2010 | Harvey ............... G06Q 10/10 715/753 |
| 2010/0274481 | A1 | 10/2010 | Krishnaswamy et al. |
| 2014/0035725 | A1* | 2/2014 | Bruemmer ......... G06K 7/10306 340/8.1 |
| 2014/0049429 | A1 | 2/2014 | Bruemmer et al. |
| 2014/0222248 | A1 | 8/2014 | Levien et al. |
| 2014/0305204 | A1 | 10/2014 | Hong et al. |
| 2014/0358434 | A1 | 12/2014 | Zhang et al. |
| 2015/0358810 | A1* | 12/2015 | Chao .................... H04W 4/001 455/418 |
| 2016/0270012 | A1* | 9/2016 | Chen .................... H04W 76/10 |
| 2016/0349362 | A1 | 12/2016 | Rohr et al. |
| 2016/0357193 | A1 | 12/2016 | Bruemmer et al. |
| 2017/0023659 | A1 | 1/2017 | Bruemmer et al. |
| 2018/0059231 | A1 | 3/2018 | Dewberry et al. |

OTHER PUBLICATIONS

International Search Report and Written Opinion for International Application No. PCT/US2016/031380 dated Aug. 19, 2016.
International Search Report and Written Opinion for International Application No. PCT/US2016/035396 dated Mar. 23, 2017.
International Search Report and Written Opinion for International Application No. PCT/US2016/035410 dated Feb. 22, 2017.
Chiu, Ultra Wideband Augmented GPS. Department of Geomatics Engineering. Geomatics Engineering. Dec. 2008. 187 pages.
Dierenbach et al., UWB for Navigation in GNSS Compromised Environments. Research Gate. Aug. 2015. 11 pages.
Pacholski, Extending the Sensor Edge Smart Drone Positioning System. University of Adelaide. Nov. 8, 2013. 58 pages.

* cited by examiner

UNIFIED COLLABORATIVE ENVIRONMENTS

RELATED APPLICATION

The present application relates to and claims the benefit of priority to U.S. Provisional Patent Application Ser. No. 62/169,689 filed 2 Jun. 2015, which is hereby incorporated by reference in its entirety for all purposes as if fully set forth herein.

BACKGROUND OF THE INVENTION

Field of the Invention

Embodiments of the present invention relate, in general, to positional correlation between local workspaces and more particularly to correlation of local workspaces to form a unified collaborative environment.

Relevant Background

Despite ongoing improvements in Artificial Intelligence (AI), a substantial gap remains between the cognitive capabilities of a human and that of a robot. A seemingly effortless task—for example, walking down a crowded sidewalk and crossing the street to arrive at bus stop in time for the next bus—remains an elusive goal of AI. Robots, and robotic technology in general, are excellent tools that can accomplish detailed and repetitive task expeditiously and tirelessly. But certain tasks and/or decision making capabilities are best satisfied by the cognitive skills of a human.

Lacking in the prior art is a means by which to combine the capabilities of a robot with the cognitive skills of a human. While many robots receive and react to user inputs, they do not merge inputs from a user in the instances in which a user's inputs are superior with those of the robot. Moreover, a vast repository of human cognition is untapped. Current robotic models enable user inputs in a very controlled or isolated environment even though users with the needed expertise may exist only a short distance away and readily available and willing to assist.

What is needed is a system and associated methodology to create a unified collaborative workspace environment in which real and virtual elements can be combined to enable robotic technology to leverage the cognitive skills of a remote human operator.

Additional advantages and novel features of this invention shall be set forth in part in the description that follows, and in part will become apparent to those skilled in the art upon examination of the following specification or may be learned by the practice of the invention. The advantages of the invention may be realized and attained by means of the instrumentalities, combinations, compositions, and methods particularly pointed out in the appended claims.

SUMMARY OF THE INVENTION

A system for establishing collaborative environments includes coupling, via a communication network, a plurality of workspace environments, a plurality of users and a collaboration module. According to one embodiment of the present invention, each workspace environment includes a workspace position engine, an asset allocation engine and workspace behavior engine. Moreover, each workspace environment is communicatively coupled to each other workspace environment establishing a peer-to-peer (P2P) network to share local positional data. The collaboration module includes a fusion engine, a collaborative behavior engine, a data analytics engine, and a task allocation engine.

Other features of the unified collaboration system include that the workspace position engine establishes a local workspace positional frame of reference for each workspace environment using a constellation of Ultra-Wide Band (UWB) transceivers. Thereafter, the fusion engine transforms the local workspace positional frame of reference for each of the plurality of workspace environments into a collaborative positional frame of reference.

According to another embodiment of the present invention, the asset allocation engine identifies for each workspace environment a set of available assets ("assets" are robots or robotic entities within the workspace environment) based on current workspace capabilities and current workspace tasks and then the task allocation engine identifies a combination of assets from each set of available assets from each workspace environment to achieve a workspace task. Finally, the task allocation engine can manage use of each set of available assets from each workspace environment to accomplish the assigned task.

As one of reasonable skill in the relevant art will recognize the communication network linking the workspaces, user interfaces and the collaboration module can take many forms including, but not limited to, a local area network, a wide area network, the Internet and the like.

The communication network supports the passing of information and enables the data analytics engine to collect data from each workspace environment, combine the data into a common data source, and identify patterns based on movement and positional data. Using this data, the workspace behavior engine directs assets within the workspace environment to accomplish a workspace task and the collaborative behavior engine augments the workspace behavior engine with real-time user inputs from a plurality of users via a plurality of user interfaces.

Another embodiment of the present invention captures a method for positional correlation to create a unified collaboration environment. The method begins by determining at each of a plurality of workspaces by a workspace position engine a local workspace positional frame of reference and, by an asset engine, a set of available assets based on current workspace capabilities and current workspace tasks. Next, a communication link is established between each of the plurality of workspaces, a plurality of user interfaces and a collaboration module establishing a P2P network between each of the plurality of workspaces to share local positional data. With communication established the method continues by receiving, at the collaboration module, data from each of the plurality of workspace environments wherein data includes the local workspace positional frame of reference, the set of available assets and workspace behavior. The collaboration module uses this data to craft a unified collaboration environment, by transforming each local workspace positional frame of reference into a collaborative positional frame of reference. The collaboration module augments asset actions by one or more workspace behavior engines, based on the real-time user input from one or more of the plurality of user interfaces.

Additional features of the aforementioned method include determining the local workspace positional frame of reference includes trilateration (position determination based on measurements of ranges from known locations) from a plurality of Ultra-Wide Band signals as well as identifying a combination of assets from each set of available assets from each workspace environment to achieve a workspace task.

Additional steps can include, at each workspace environment, directing, by a workspace behavior engine, assets to achieve the workspace task and managing use of each set of available assets from each workspace environment to accomplish the workspace task.

The features and advantages described in this disclosure, and in the following detailed description, are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of one or more embodiments taken in conjunction with the accompanying drawings, wherein.

The Figures depict embodiments of the present invention for purposes of illustration only. One skilled in the art will readily recognize from the following discussion that alternative embodiments of the structures and methods illustrated herein may be employed without departing from the principles of the invention described herein.

DESCRIPTION OF THE INVENTION

A system and related methodology is hereafter disclosed by way of example for positional correlation between multiple local workspaces forming a unified collaborative environment that can incorporate both real and virtual elements. UWB tags establish a correlation or interplay between remote and physically present humans within a variety of physical workspace environment that blends real and virtual elements in real time, based on accurate collaborative positioning and orientation.

One embodiment of the invention provides a safe, reusable, extensible immersive environment for education, training and gaming based on correlating positioning between multiple workspaces (both remote and proximal) through the use of UWB tags. The methodology associated with this invention provides a way to unite positional reference frames of multiple workspaces by merging the movement and visualization of real entities with both that of virtual entities, that exist only in a virtual environment, and shared entities, that exist for real in some of the workspaces but not in others. One important aspect of the invention is to merge these real and virtual elements into a unified collaborative workspace.

Figure 1:
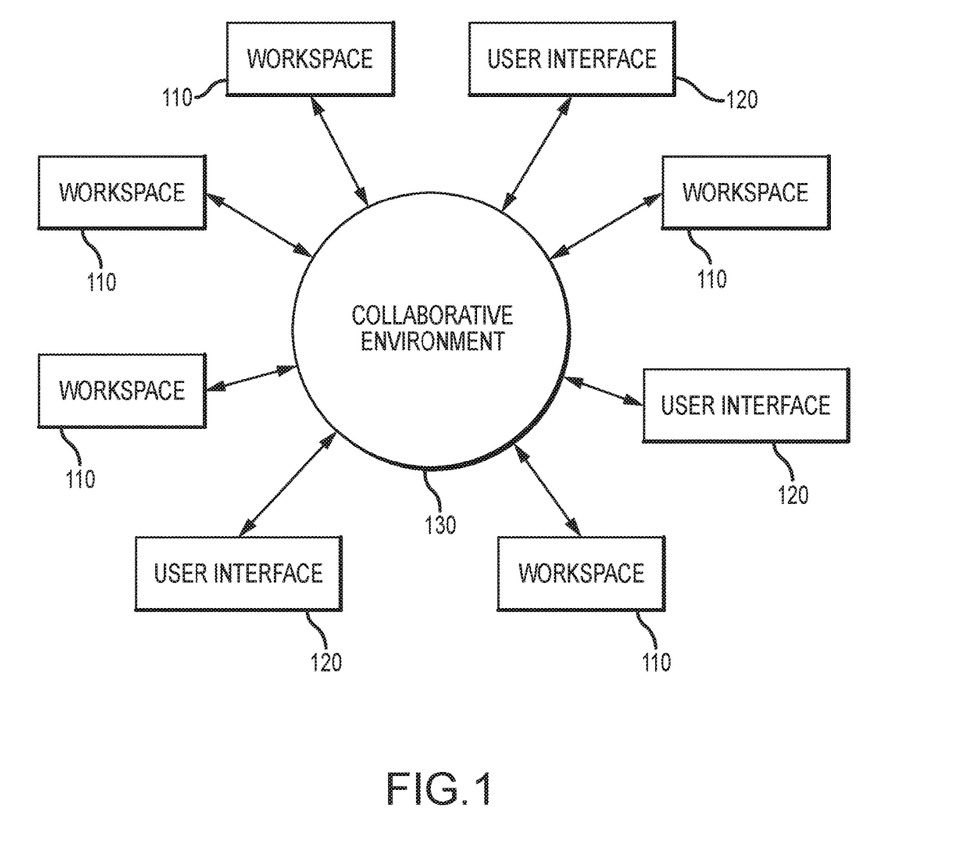
FIG. 1 shows a high level block diagram of a collaborative workspace environment according to one embodiment of the present invention.

FIG. 1 presents a high level view of a collaborative environment according to one embodiment of the present invention. As shown, a collaborative environment 130 is a focal point of a plurality of workspace environments 110 and various user inputs 120. The collaborative environment crafts a unified frame of reference by which disparate users and workspaces can come together to modify behavior.

Embodiments of the present invention are hereafter described in detail with reference to the accompanying Figures. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Like numbers refer to like elements throughout. In the figures, the sizes of certain lines, layers, components, elements or features may be exaggerated for clarity.

The terminology used herein is for the purpose of describing particular embodiments only and is not intended to be limiting of the invention. As used herein, the singular forms "a," "an" and "the" are intended to include the plural forms as well, unless the context clearly indicates otherwise. Thus, for example, reference to "a component surface" includes reference to one or more of such surfaces.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be also understood that when an element is referred to as being "on," "attached" to, "connected" to, "coupled" with, "contacting", "mounted" etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of a device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of "over" and "under". The device may be otherwise oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only unless specifically indicated otherwise.

Throughout the application the following terms are used to describe the inventive aspects of the invention. The definitions below are presented to aid in the clarity of the discussion that follows "Unified", for the purposes of the present invention means to combine, make a single unit or unite. A "workspace" is an environment in which a task is accomplished or set to be accomplished with a predetermined set of capabilities. These real world workspace environments are combined with virtual elements.

A "virtual environment" or "virtual element" is a computer-generated, three-dimensional representation of a setting or capability in which the user of the technology perceives themselves to be and within which interaction takes place (also called a "virtual landscape", "virtual space" or "virtual world"). For example, in a virtual game of tennis users would see themselves on a tennis court. The tennis court would be a virtual environment while the virtual tennis racket that the user is "holding" is a virtual element. By using geometric shapes and stipulating the timing and three dimensional position of the shape in workspace frame of reference rather than simply communicating pixels of the shape as in a video, the complexity of the data communication is significantly reduced thereby enabling to convey the entirety (or substantially the entirety) of the workspace across great distances in real time even if bandwidth is limited.

The focus of the invention is establishing a collaborative and unified environment. Collaborative or Collaboration means to work with one with another; cooperate, as on a literary work or similar project, to cooperate, work jointly on an activity to produce or create something.

While concepts such as collaboration and unified environments are important to achieve an understanding of the present invention, so too is the process by which a local frame of reference is determined. One such technique, and one used throughout the present invention is trilateration. Trilateration is, in essence, an examination of position by analyzing the intersection of spheres wherein each sphere represents a possible location of a signal's origin.

Consider the following example. If you know you are 10 miles from satellite A in the sky, you could be anywhere on the surface of a huge, imaginary sphere with a 10-mile radius. If you also know you are 15 miles from satellite B, you can overlap the first sphere with another, larger sphere. The spheres intersect in a perfect circle. Your location is therefore somewhere on the line forming the circle. If you know the distance to a third satellite, you get a third sphere, which intersects with this circle at two points. And finally a fourth sphere narrows the result to a single point. Trilateration works in a similar way to pinpointing your position on a map knowing the precise distance from three different landmarks using a pair of compasses. Where the three circles centered on each of the landmarks overlap is your location given the radius of each circle is your distance from each landmark. The process works with only three landmarks on the surface of the earth because the earth is the final sphere.

This is precisely how a Global Positioning System ("GPS") receiver calculates its position. It does so by precisely timing the signals sent by GPS satellites high above the Earth. Each satellite continually transmits messages that include the time the message was transmitted and the satellite position at time of message transmission.

The receiver uses the messages it receives to determine the transit time of each message and computes the distance or range to each satellite. These distances, along with the satellites' locations, are used to compute the position of the receiver. A satellite's position and range define a sphere, centered on the satellite, with radius equal to the range. The position of the receiver is somewhere on the surface of this sphere. Thus, with four satellites, the indicated position of the GPS receiver is at or near the intersection of the surfaces of four spheres. In the ideal case of no errors, the GPS receiver would be at a precise intersection of the four surfaces.

A unique aspect of the present invention is determining a local frame of reference (position) using Ultra-Wide Band transceivers. Ultra-Wide-Band (also known as UWB or as digital pulse wireless) is a wireless technology for transmitting large amounts of digital data over a wide spectrum of frequency bands with very low power for a short distance. UWB radio not only can carry a huge amount of data over a short distance at very low power (less than 0.5 mw), but also has the ability to carry signals through doors and other obstacles that tend to reflect signals at more limited bandwidths and a higher power. UWB can be compared with another short-distance wireless technology, Bluetooth, which is a standard for connecting handheld wireless devices with other similar devices and with desktop computers.

UWB broadcasts digital pulses that are timed very precisely on a carrier signal across a very wide spectrum (number of frequency channels) at the same time. Transmitter and receiver must be coordinated to send and receive pulses with an accuracy of trillionths of a second. On any given frequency band that may already be in use, the UWB signal has less power than the normal and anticipated background noise so theoretically no interference is possible.

One aspect of the present invention is the use of one or more active position UWB transceivers or tags to establish a local frame of reference. As suggested above, active tag tracking is not limited to line of sight and is not vulnerable to jamming. These UWB radio frequency (RF) identification (ID) tag systems (collectively RFID) comprise a reader with an antenna, a transmitter, and software such as a driver and middleware. One function of the UWB RFID system is to retrieve state and positional information (ID) generated by each tag (also known as a transponder). Tags are usually affixed to objects so that it becomes possible to locate where the object is without a direct line-of-sight given the low frequency nature of the UWB transmission. A UWB tag can include additional information other than the ID. A single tag can also be used as a beacon for returning to a specific position or carried by an individual or vehicle to affect a follow behavior from other like equipped objects. As will be appreciated by one of reasonable skill in the relevant art, other active ranging technology is equally applicable to the present invention and is contemplated in its use. The use of the term "UWB", "tags" or "RFID tags," or the like, is merely exemplary and should not be viewed as limiting the scope of the present invention.

A RFID and/or UWB tag cannot only be associated with a piece of stationary infrastructure with a known, precise, position, but also provide active relative positioning between movable objects. For example, even if the two or more tags are unaware of their precise geospatial position, they can provide accurate relative position. Moreover, the tag can be connected to a centralized tracking system to convey interaction data or coupled to a network of other tags to establish a peer-to-peer network. As a mobile object interacts with the tag of a known position, the variances in the object's positional data can be refined. Likewise, a tag can convey not only relative position between objects but relative motion between objects as well. Such tags possess low-detectability and are not limited to line of sight nor are they vulnerable to jamming. And, depending on how mounted and the terrain in which they are implemented, a tag and tracking system can permit user/tag interaction within a range from 200 feet to two miles. While the present invention is described by way of examples in which workspaces and objects within those workspaces may be represented by vehicles or platforms, an object is to be interpreted as an arbitrary entity that can implement the inventive concepts presented herein. For example, an object can be a robot, vehicle, UAS, aircraft, ship, bicycle, or other device or entity that moves in relation to another. The collaboration and communication described herein can involve multiple modalities of communication across a plurality of mediums.

The active position UAW tags of the present invention can provide bearing as well as range information. Using triangulation and trilateration between tags, a route can be established using a series of virtual waypoints. According to one or more embodiments of the current invention, multiple ranges between the active position tags can be used to create a mesh network of peer to peer positioning where each workspace can contribute to the overall framework. Each tag or object can vote as to its own position and subsequently the relative position of its nearest neighbors. Importantly, the invention provides a means of supplementing the active tags with ranges to other landmarks. Thus when other active modules or objects are not present, not visible or not available, other sensors/modalities come into play to complement a mesh network.

For example, assume there are four objects within a workspace. The first object can see (sense) the second and third object but not the forth. The second and third object each see the fourth object. Using data conveyed to it from the second and third object the fourth object can determine by itself the location of the forth object.

Lastly it is important to understand that a constellation is simply a group or association of objects. For the purpose of the present invention a constellation is a grouping of UWB transceivers that enable two of more mobile devices determine their relative position. The constellation may be in a fixed geospatial location in a fixed orientation on a movable object. The actual positioning of each UWB transceiver on an object or at a location may vary and, as discussed below, may enable further refinement of the determination of a local frame of reference.

According to one embodiment of the present invention each physical workspace has its own UWB tag constellation that provides a mesh network of peer-to-peer positioning and communication within a local frame of reference. The local positional reference frame of each of a plurality of physical workplaces is communicated to a collaboration module along with a time stamp where they are unified using multiple transforms, each of which transforms from the local position reference framework into the unified synchronized environment. This allows positioning from the individual workspace to function organically and to coordinate activities within that reference frame but at the same time allows for selective "interplay" between the physically separate and potentially distant workspaces. The interplay can involve both real and virtual elements. The real elements can include physical equipment, vehicles, planes, individual workers, UAS, UGVs packages, and the like. The virtual elements can include abstracted representations of the real assets as well as cues embedded into the collaborative environment such as:

Virtual arrows to indicate intended motion, directions, etc.
Point clouds that indicate plumes of substances: HAZMAT chemicals, electromagnetic fields, moisture, etc.
Boundary lines that indicates real barriers, personal exposure limits, boundaries for authorized motion, security perimeters, areas of interest, areas of exclusion, areas of inclusion, communication boundaries, GPS boundaries, regulatory boundaries (prevent fly away or uncontrolled operations) etc.
Position-based or entity-based instructions that appear in the environment attached to various real or virtual entities (e.g. spin this dial to 60)
Traversal paths that indicate a desired or intended path (i.e. green path) or a peer path (i.e. a path with a color matching an alternate vehicle or player in the system).
Inter-Workspace HyperJumps→special "links" that allow players or vehicles to "jump" from one parallel workspace into another.

Intra-Workspace HyperJumps→special "links" that allow players to vehicles to "jump" within an environment from one place to another Vehicle "Hyper-Handles" that allow a player to gain control of a particular vehicle and begin to claim ownership of it, task it or control it in some way.

Player "Hyper-Handles" that allow a player to gain control of a particular person or another real or virtual person or perhaps even an AI system or virtual player.

These virtual elements when combined to the collaborative environment can enable a user to participate in one or more workspaces to augment ongoing autonomous/robotic behavior. The types of participants or users include:

non-embodied immersed participants who are not participating in a constellation physically but who can participate virtually using an immersive headset (i.e. oculus rift) and/or haptic motion sensors that allow them to become a purely virtual entity in the collaborative environment.

non-tagged physical participants who are physically in one of the workspaces but who do not have tags. These physical participants can be perceived by sensors in the environment (i.e. lasers or cameras setup around the workspace).

tagged participants who are tracked within the constellation very precisely based on the UWB positioning. These can be people with one tag and two antennas in which case their orientation as well as position can be tracked. This allows those participants to always know precisely their heading within the unified collaborative world.

non-immersed, non-embodied observers who are basically just viewing the collaborative environment (one of the individual workspaces) from a regular non-immersive screen such as a smart phone app or a laptop computer.

Bio-bots: tagged participants who are available to be tasked, meaning that they are effectively like robots in the environment. Note that Bio-bots can be humans who are willing to be tasked by the system. These humans can receive tasking in various ways along a spectrum of tele-operation to high level tasking.

Figure 2:
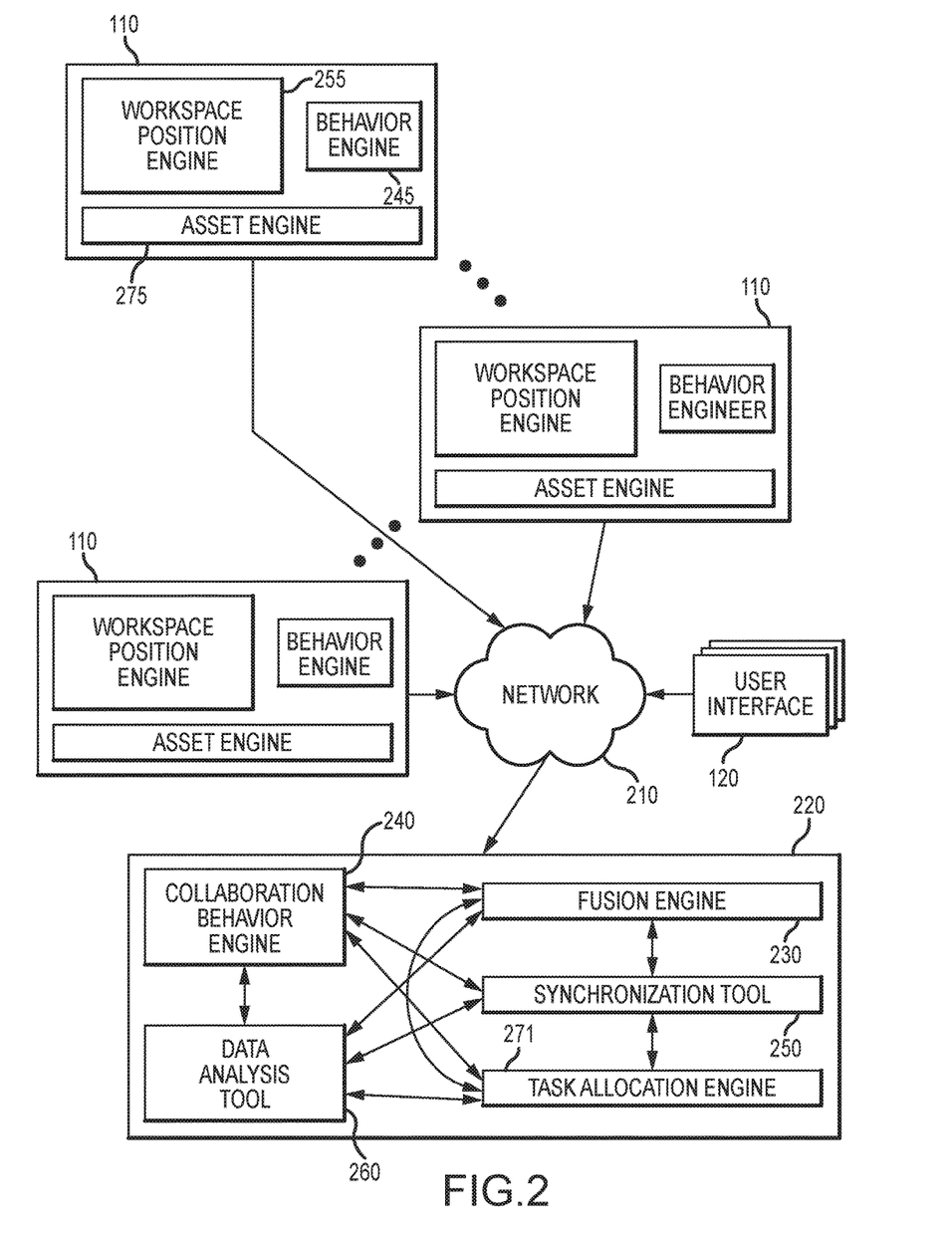
FIG. 2 shows a high level block diagram of a system for a system for collaborative environments according to one embodiment of the present invention.

According to one embodiment of the present invention and as illustrated in FIG. 2, a collaboration module 220 includes a collaborative behavior engine 240, a fusion engine 230, a synchronization tool 250, a data analytics tool 260, and a task allocation engine 270. Each of these components within the collaboration module 220 is communicatively coupled via a network 210 to each other to exchange data and resources so as to form a unified environment.

In one version of the present invention the data analytics tool 260 that collects data from each physical workspace 110 with respect to movement, patterns, behaviors, etc. The data analytics engine can devise strategies, observe trends, and even solve real computational problems (i.e. traveling salesman) by extracting effective strategies and patterns from the movement of real and virtual entities. For instance, gaming within the system could be used to learn strategies for defense and security applications.

The fusion engine 230 transforms each individual local workspace position reference frame into the unified collaborative workspace. By identifying common frames or references among the plurality of disparate physical workspaces, the fusion engine can create a unified environment so that a user can easily transition from one workspace to another and augment the actions undergoing in one workspace from another.

The task allocation engine 270 is an artificial intelligence task scheduler that runs in the cloud or on a server that checks what assets are available among the plurality of workspaces and connects various assets for the accomplishment of a task or set of tasks. These assets can include that from a plurality of user interfaces. For example, the task allocation system may involve finding a human at a computer in Indonesia to drive a real forklift in Paris. Selection is made based on rating of each asset and a mapping between their capabilities and the needs of the task.

The collaborative behavior engine 240 manages the activity of the unified environment and provides autonomous function within the collaborative environment for any entity (it could be manipulation or navigation or combinations of the two). The behavior engine can provide algorithms for safe motion, follow, autonomous navigation, etc. These behaviors can reside on a particular element within a workspace or within the collaboration module and later assigned to a particular module as needed.

One aspect of the present invention is to "outsource" cognition through what is sometimes called "real-gaming". We can essentially outsource robot behavior to a willing human brain. The brain could be in India, Kazakhstan or the Bronx and linked to the applicable workspace through the collaboration module.

To outsource cognition another aspect of the present invention is to communicatively couple a plurality of user interfaces to the collaborative module via the communication network. Each of these interfaces can be used as a means to link an individual with a workspace via a network. Another aspect of the present invention is the use of ad hoc networking solution that allows each networked entity (workspace or user) that is able to participate actively within the collaborative environment communicate with the collaborative module which is performing the fusion and hosting the collaborative environment.

The collaborative module 220 is also communicatively coupled a plurality of workspaces 110. Each of these workspaces includes a workspace position engine 255, a workspace behavior engine 245 and an asset engine 275. In each workspace the fusion engine 230 calculates, in one embodiment, UWB positioning based on trilateration between the UWB tags in the constellation and the tags within the workspaces. It also may include inertial sensing, camera tracking, laser tracking, wheel encoders on vehicles and other sensors to augment positioning or allow untagged entities to be tracked.

Vehicles (i.e. forklifts, lawnmowers, vacuums, cars) that can actually be driven in a workspace to do real work (i.e. transport pallets, vacuum office buildings, mop floors, drive taxicabs) are identified within each workspace frame of reference. These vehicles each have between two and four UWB tags to track their position within the workspace.

The asset engine 275 associated with each workspace works with the behavior engine 245 to identify which asset can be used to achieve a directed task. The asset engine also reports to the collaborative module 220 when there are unused resources or the workspace has excess capabilities. The behavior engine 245 may also work with the asset engine 275 and the collaborative module 220 to ascertain if the workspace can be augmented with user input to achieve an otherwise inoperable task.

Assume for example a workspace environment exists in a warehouse housing building supplies. Each night robots move various pallets based on the upcoming days shipment orders to stage the loading in the morning. The forklifts can, within certain criteria, operate autonomously and the workspace behavior engine monitors each forklifts operation.

In this example, a task to stage a pallet containing a heavy component is received. While the forklift possesses the capability of lifting and delivering the component, regulations require that the operation be conducted by a human with a high degree of experience. Yet, at this instant of time there is no forklift operator with the required degree of experience present.

According to one embodiment of the present invention, a forklift operator a half a world away can use a virtual environment to augment the forklifts actions. The user identifies himself to the collaborative module with a certain degree of qualification. Once validated the collaboration module identifies that there is a workspace in need of user augmentation. The collaboration module presents to the user a unified environment in which he can monitor and direct the forklift as if he was actually driving the machine. The behavior engine at the workspace and at the collaboration module monitors the activity to make sure the actions are within the predetermined guidelines while still enabling the workspace to accomplish its directed task even though it did not internally possess the necessary capabilities.

There is no substitute for the human brain when it comes to an incredibly wide range of jobs that an individual can accomplish including janitorial work, gardening, cleaning up the kitchen, etc. Robots can accomplish many task, yet there remain number of tasks that still require the cognitive stills of a human brain to despite the repetitive or tedious nature of the task. To enable this sort of augmented input the collaboration module recognizes that there needs to be:

On board behaviors that can supersede erroneous or foolhardy input from a user augmenter as needed.
System level user support capabilities so that unskilled labor could easily interact in an effective way with the system.
Situation awareness visualization tools that abstract the real world into a video game.
Collaborative behaviors that control and facilitate behavior of multiple assets in the system.
A plug and play kit concept so that a family of vehicles can be linked to a family of add-on kits for various jobs.

Many behaviors are too hard for artificial intelligence to tackle successfully either because of positioning, sensing or cognitive resources. Driving complicated vehicles, for example, may in fact be the most difficult area to break into using solely AI, but there are a host of other tasks including domestic jobs that currently cannot be accomplished by autonomous robotic behavior. The present invention uses networking to outsource the human insight, decision making and contextual knowledge that AI lacks for a particular task. People with time on their hands (elderly, teenagers, unemployed) could log in at their leisure to serve as plug-in behavior providers. To these cognitive augmenters it would seem like a video game but they would be rewarded not in points, but rather paid based on their skill and task success. And participants would only get access to jobs commensurate with demonstrated skill and responsibility.

But unlike a game, there are real world risks and costs involved. The workspace and the collaborative behavior engines make sure that the robot remains safe and does not end up doing damage (e.g. guarded motion, scan and advance, threat avoidance, etc.).

Consider another example. Imagine a situation where a person can walk through a real store and see real products but also see virtual images of other products absent from the store but offered at a different location. According to one embodiment of the present invention, the other users all see the same elements (products) in the same exact location at the same time. The collaborative positioning technology could enable several users to act in a real world environment at the same time. The user in one workspace selecting an item in another place would have that items shipped or identified as being allocated. Going back to the forklift example. Assume a worker is driving another forklift in the workspace. The present invention would allow the remote users to see the other worker and de-conflict as if he/she were physically present. In addition, the present worker could interact with the remote worker to determine a best course of action. The remote user would be presented with a virtual environment of what the real worker is physically experiencing.

The present invention can allow multiple people in multiple places to perform real work from remote locations on a real worksite. With the present invention it is possible that a number of forklifts exist in a logistics center and no one actually ever sits in and actual device yet cognitive skills are being used along with autonomous robot operations to provide an effective operation. The autonomy on board each device ensures safe motion and allows directed navigation but humans step in from a remote location to provide direction at whatever level is appropriate (on a scale from direct driving to selection of tasks at a high level).

Other embodiment of the present invent can be applied to the entertainment industry as the invention brings a movie or book to life, allowing artists to create residual artifacts into the collaborative environment, adding virtual entities such as dragons to be slain in a live video game, geological artifacts in a pyramid because in that case they can imagine themselves doing the things they are reading. For example, what if individuals could immerse themselves in a real-world movie where their whole body is part of the unfolding drama around? By wearing a few as two tags a player can be placed into the environment. The UWB tags allow a dreamscape to incorporate a user's presence, track every move and effectively insert the user into the multi-person imaginary environment.

Yet another embodiment of the present invention is to enable real time input by individual into a duplicative environment that results in a real-time modification of the workspace in a different location. In many critical applications a duplicate environment is created to enable a user, who is not physically present at the environment, better understand and interpret the workspace. NASA for example maintains a full scale duplicate of the International Space Station to enable engineers and scientist access to their best representation possible of the Space Station orbiting the earth. While certainly all of the conditions cannot be replicated such as weightlessness, the duplicate environment provides tremendous amounts of insight that may otherwise be overlooked.

Something as simple as the replacement of a panel or a piece of equipment inside the space station may require something that one would not normally consider such as having to pass the equipment through an airlock or around a tight corner that is constrained. The duplicate environment provides tremendous data that cannot be directly anticipated.

One embodiment of the present invention enables a user to work within a duplicate environment to affect operations in a remove workspace. A remote workspace can be duplicated and by combining the virtual environment of the workspace conveyed by the UWB with that of the duplicate workspace minor differences can be identified. Moreover, a user, working with manipulative tools can conduct operations in the duplicative space that is, in real time, carried out in the actual workspace.

And, using the collaborative module and fusion the duplicative environment with that of the workspace, minute differences can be detected and accommodations can be made. Imagine a user working on an arctic exploration remotely but rather than simply sending signals that the robot will execute the scientist can interact with the equipment.

Another feature of the present invention is to merge virtual and real environments into a collaborative environment in which a plurality of users can interact even though the users may individually be in remote locations. A workspace is virtualized into a collaborative environment in which multiple users can simultaneously interact. A physical environment is represented in real-time to a user using virtualization technology. The user or users can thereafter interact with the environment and with the components in the environment to affect change in the actual workspace.

Fundamental to this creating a collaborative workspace is precise positional information that is synchronized. Using UWB tags or transmitters in a constellation and similar UWB tags affixed to a user or user input, precise relational data can be gained to enable the virtual representation to be a real-time picture of the physical environment.

According to another aspect of the present invention, the workplace environment can be stored and replayed at will. By doing so an input from a user in one location can occur and stored at one time while an input from another user at another location and at a different time can also occur and be stored. The input of the second user and the first user and based on the same common collaborative environment but their inputs occur at different moments in time. Once recorded, the present invention can then synchronize their inputs and show their combined interaction with the physical workspace. The fusion of the user inputs can thereafter be applied to the physical workspace.

As one of reasonable skill in the relevant art will recognize the invention incorporates a behavior, artificial intelligent, engine of the workspace environment that interacts with the remote users. Thus, the invention is more than simply remotely controlling a device. The provides additional information from which the behavior engine in the actual workspace can react. For example, a robot within the workspace may have a task to pick up and remove hazardous material. The environment may be such that working autonomously poses a challenge thus human interaction and augmentation is necessary to successfully accomplish the task. However, the behavior engine of the robot receives the input from the user as another source of data from which to operate. The user is not in direct control of the robot but rather support or augments the robot's behavior decision making capability.

The present invention provides a means by which disparate workplaces and users can interact in collaborative environment. This collaborative environment is formed with the precision locational information provided by UWB transceivers. The UWB pulse not only supplies data sufficient for trilateration but also supplies a time stamp that enables a collaboration engine to fuse multiple environments to a common "collaborative" environment. Through this environment users at remote locations can offer input and augment the actions ongoing in various workspaces.

In the description that follows, flowcharts are used depicting examples of the methodology which may be used for positional correlation and collaboration. In the following description, it will be understood that each block of the flowchart illustrations, and combinations of blocks in the flowchart illustrations, can be implemented by computer program instructions. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instructions.

Figure 3:
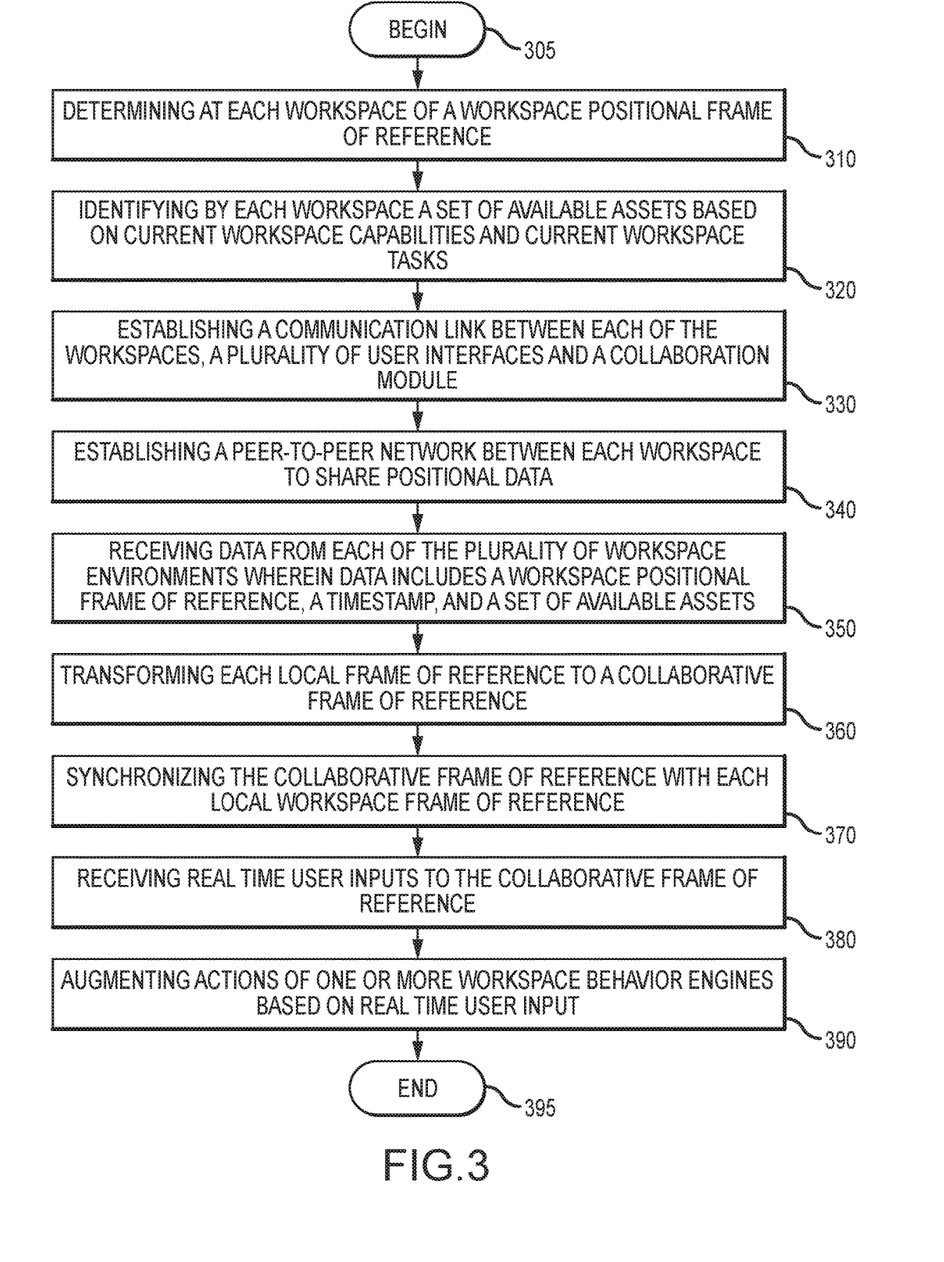
FIG. 3 is a flowchart of a method for positional correlation in a collaborative environment according to one embodiment of the present invention.

FIG. 3 is a flowchart of one embodiment of a method according to the present invention for creating a collaborative environment. The process begins 305 with determining 310 at each of a plurality of workspaces a local workspace positional frame of reference. Using an asset engine, the process continues by identifying 320 a set of available assets at each workspace based on current workspace capabilities and current workspace tasks. For example, a workspace may involve loading 20 pallets of material using a two forklifts. A communication link is established 330 between each workspace, a plurality of user interfaces and a collaboration module. By doing so the collaboration module establishes 340 a peer-to-peer network between each of the plurality of workspaces to share local positional data.

Receiving 350, at the collaboration module, data from each of the plurality of workspace environments including the local workspace positional frame of reference, a time stamp, the set of available assets and workspace behavior is the next step. The collaboration module transforms the data from each local workspace positional frame of reference 360 into a collaborative positional frame of reference and thereafter the collaborative positional frame of reference is synchronized 370 with each local workspace positional frame of reference.

Real-time user inputs are received 380 by the collaborative positional frame of reference that the collaborative behavior engine uses to augment 390 actions taken by one or more workspace behavior engines ending 395 the process.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Upon reading this disclosure, those of skill in the art will appreciate still additional alternative structural and functional designs for a system and a process for establishing a collaborative environment through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope of the invention.

It will also be understood by those familiar with the art, that the invention may be embodied in other specific forms without departing from the spirit or essential characteristics thereof. Likewise, the particular naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

Software programming code, which can embody a portion of the present invention, is typically accessed by a microprocessor from long-term, persistent storage media of some type, such as a flash drive or hard drive. The software programming code may be embodied on any of a variety of known media for use with a data processing system, such as a diskette, hard drive, CD-ROM, or the like. The code may be distributed on such media, or may be distributed from the memory or storage of one computer system over a network of some type to other computer systems for use by such other systems. Alternatively, the programming code may be embodied in the memory of the device and accessed by a microprocessor using an internal bus. The techniques and methods for embodying software programming code in memory, on physical media, and/or distributing software code via networks are well known and will not be further discussed herein.

Generally, program modules include routines, programs, objects, components, data structures and the like that perform particular tasks or implement particular abstract data types. Moreover, those skilled in the art will appreciate that the invention can be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

An exemplary system for implementing the invention includes a general purpose computing device such as the form of a conventional personal computer, a personal communication device or the like, including a processing unit, a system memory, and a system bus that couples various system components, including the system memory to the processing unit. The system bus may be any of several types of bus structures including a memory bus or memory controller, a peripheral bus, and a local bus using any of a variety of bus architectures. The system memory generally includes read-only memory (ROM) and random access memory (RAM). A basic input/output system (BIOS), containing the basic routines that help to transfer information between elements within the personal computer, such as during start-up, is stored in ROM. The personal computer may further include a hard disk drive for reading from and writing to a hard disk, a magnetic disk drive for reading from or writing to a removable magnetic disk. The hard disk drive and magnetic disk drive are connected to the system bus by a hard disk drive interface and a magnetic disk drive interface, respectively. The drives and their associated computer-readable media provide non-volatile storage of computer readable instructions, data structures, program modules and other data for the personal computer. Although the exemplary environment described herein employs a hard disk and a removable magnetic disk, it should be appreciated by those skilled in the art that other types of computer readable media which can store data that is accessible by a computer may also be used in the exemplary operating environment.

While there have been described above the principles of the present invention in conjunction with positional correlation in a collaborative environment, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

The invention claimed is:
1. A method for positional correlation in a collaborative environment, comprising:

determining at each of a plurality of workspaces by a workspace position engine a local workspace positional frame of reference;

identifying at each of the plurality of workspaces by an asset engine a set of available assets based on current workspace capabilities and current workspace tasks;

establishing a communication link between each of the plurality of workspaces, a plurality of user interfaces and a collaboration module;

establishing a peer-to-peer network between each of the plurality of workspaces to share local positional data;

receiving, at the collaboration module, data from each of the plurality of workspace environments wherein data includes the local workspace positional frame of reference, a time stamp, the set of available assets and workspace behavior;

transforming each local workspace positional frame of reference into a collaborative positional frame of reference;

synchronizing the collaborative positional frame of reference with each local workspace positional frame of reference;

receiving, from one or more of the plurality of user interfaces, a real-time user input to the collaborative positional frame of reference; and augmenting, by a collaborative behavior engine, actions by one or more workspace behavior engines based on the real-time user input to the collaborative positional frame of reference.

2. The method for positional correlation in a collaborative environment according to claim 1, wherein determining the local workspace positional frame of reference includes trilateration of a plurality of Ultra-Wide Band signals.

3. The method for positional correlation in a collaborative environment according to claim 1, wherein identifying includes identifying a combination of assets from each set of available assets from each workspace environment to achieve a workspace task.

4. The method for positional correlation in a collaborative environment according to claim 3, further comprising, at each workspace environment, directing, by a workspace behavior engine, assets to achieve the workspace task.

5. The method for positional correlation in a collaborative environment according to claim 3, further comprising managing use of each set of available assets from each workspace environment to accomplish the workspace task.

6. The method for positional correlation in a collaborative environment according to claim 3, further comprising representing assets of each workspace in the collaborative positional frame of reference as geometric shapes with stipulated timing and relative positioning.

7. The method for positional correlation in a collaborative environment according to claim 6, whereby representing assets of each workspace in the collaborative positional frame of reference as geometric shapes with stipulated timing and relative positioning, data complexity representation of each workspace is reduced.

8. The method for positional correlation in a collaborative environment according to claim 1, wherein the communication link is via a communication network.

9. The method for positional correlation in a collaborative environment according to claim 1, further comprising identifying for each workspace patterns based on movement and positional data.

10. The method for positional correlation in a collaborative environment according to claim 1, further comprising coordinating behavior among assets from a two or more workspaces.

\* \* \* \* \*